CONTENT ADDRESSABLE ASSOCIATIVE MEMORY WITH AN OUTPUT COMPARATOR

Filed Nov. 19, 1962 2 Sheets-Sheet 1

INVENTORS
FRANCIS J. BELCOURT
LOUZELLE A. LUKE
BY Marvin Jacobson
ATTORNEY

CONTENT ADDRESSABLE ASSOCIATIVE MEMORY WITH AN OUTPUT COMPARATOR

Filed Nov. 19, 1962 2 Sheets-Sheet 2

TUNNEL DIODE CHARACTERISTICS

BACKWARD DIODE CHARACTERISTICS 3,290,661
Patented Dec. 6, 1966

3,290,661

CONTENT ADDRESSABLE ASSOCIATIVE MEMORY WITH AN OUTPUT COMPARATOR

Francis J. Belcourt, Lake Elmo, and Louzelle A. Luke, Coon Rapids, Minn., assignors to Sperry Rand Corporation, New York, N.Y., a corporation of Delaware Filed Nov. 19, 1962, Ser. No. 238,622
3 Claims. (Cl. 340—173)

This invention relates generally to the field of electronic data processing apparatus. More particularly, this invention is directed toward improved electronic circuitry which is selectively settable to one of two stable operational states and means for detecting which of the operational states the circuitry is in. The invention still further contemplates a plurality of said type of improved circuits, each of which is selectively settable to one of its operating states in accordance with information representing signals, and means for detecting said operational states in a predetermined sequential order.

It is an object of this invention to provide a bistable circuit which is responsive to high speed detecting or sensing pulses.

It is a further object of this invention to achieve the immediately foregoing object with a circuit of relatively simple design.

The preferred embodiment of the bistable circuit comprises a semiconductor device constructed to experience tunnel diode effects in combination with unilateral conducting devices. Means are provided to selectively set the tunnel diode to one of its two operational states respectively of relatively high and relatively low impedance levels. Means are further provided to apply an interrogating signal to the tunnel diode circuit through unilateral conducting means for detecting the operational state of the tunnel diode. The unilateral conducting means is coupled to the tunnel diode circuit in a manner such that the interrogating signal is allowed to pass through the unilateral conducting means only if the tunnel diode is in a predetermined one of its operational states. When the latter condition occurs an output pulse signal, in response to the interrogating signal, is provided by the tunnel diode circuit to indicate its operational state. Since the tunnel diode inherently has amplifying characteristics, the signal-to-noise ratio of the above described output signal is high enough so as to not require any further amplification. In this manner the tunnel diode provides a dual function as a storage element and an amplifying element.

With a plurality of bistable circuits, each of which have operational states of relatively high and relatively low impedance levels, a single interrogating line is used. This line is constructed in a manner to experience transmission line effects and the bistable circuits are coupled thereto in spaced-apart relationship along the length of the line. An interrogating pulse applied to the input end of the interrogating line propagates toward the terminating end. The bistable circuit closest to the input end of the interrogating line which is in a predetermined one of its two operational states, will present a low impedance to the interrogating signal with a resulting termination in the propagation of said interrogating signal. The interrogating signal, in passing through the bistable circuit, switches it to its other operational state so that subsequent inerrogating signals will see it as a high impedance. This switching action results in an output signal indication of the previous operational state. Interrogating signals are repetitively applied to the interrogating line until the operating state of all of the bistable circuits has been detected. This provides a means for decoding the information stored by said plurality of bistable circuits without the requirement for complex translation or decoding circuitry. Utilizing the preferred embodiment of the bistable circuit which incorporates a tunnel diode, said tunnel diode being responsive to short duration and fast rise time pulses, the speed of decoding is not sacrificed in the achievement of the relatively simple design.

These and other more detailed and specific objects and features will be disclosed in the course of the following specification, reference being had to the accompanying drawings, in which.

Figure 1:
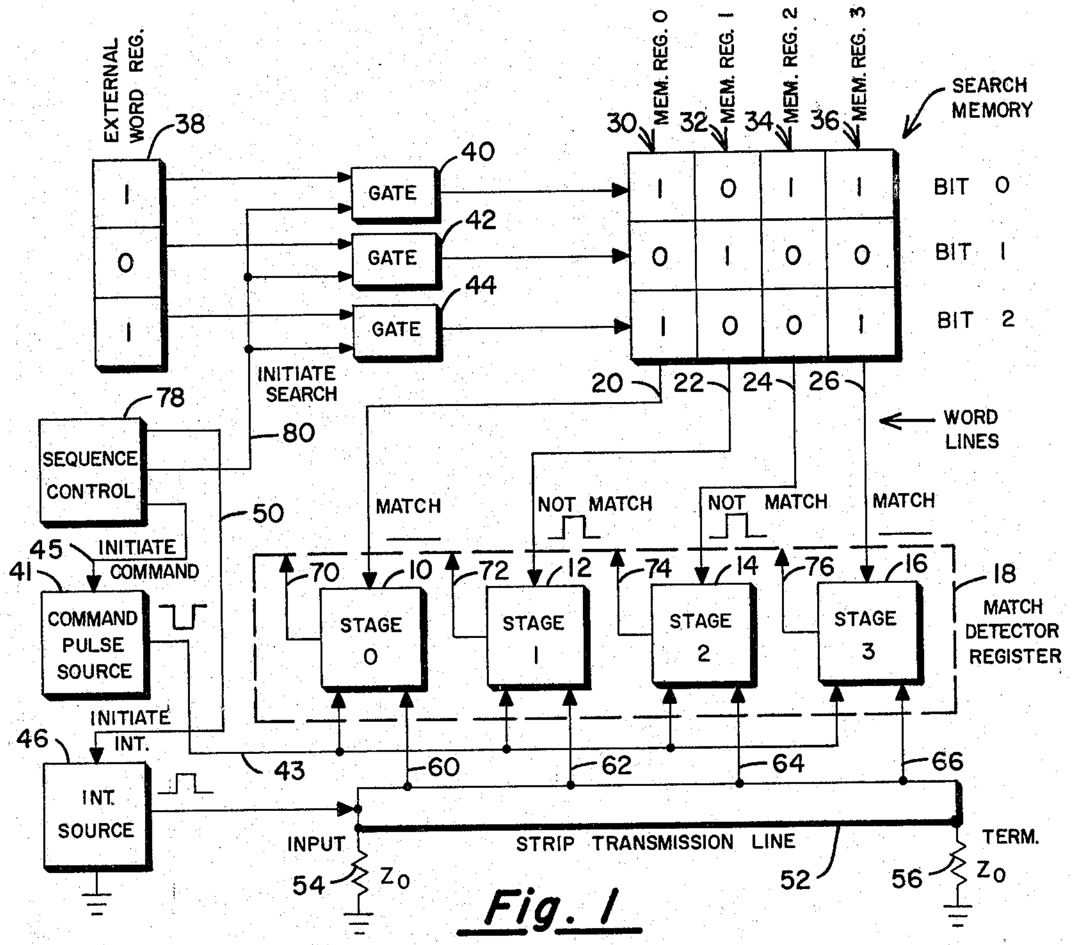
FIG. 1 shows a preferred embodiment of this invention used in combination with a search memory.

In FIG. 1, a plurality of bistable stages 0–3 respectively labelled as items 10, 12, 14 and 16 are the four stages of Match Detector Register 18. Four word lines, 20, 22, 24 and 26, respectively, provide a first input to corresponding stages 0–3 of the Match Detector Register. Each of said word lines are associated with a different Memory Register of a Search Memory device. Each of the Memory Registers, respectively 30, 32, 34 and 36, is labelled 0–3 according to its memory location in the well-known manner. It can be seen that through the word lines each of the Memory Registers is associated with a respectively different corresponding stage of the Match Detector Register 18.

The Search Memory per se is not considered a part of the instant invention so no detailed explanation of its operation will be included herein. A complete and detailed description of a typical Search Memory is contained in copending application by Keefer, Serial No. 019,833, filed April 4, 1960, now Patent No. 3,155,545, and assigned to the same assignee of the instant invention, and a further variation of a Search Memory is described in the application by Joseph et al., Serial No. 191,547, filed May 1, 1962, and also assigned to the assignee of the instant invention. In general, a plurality of binary words or numbers, the values of which are unknown, are stored in the Memory Registers with each bit in corresponding digit or bit order position. In the embodiment shown in FIG. 1 for illustrative purposes, each of the stored words is of three-bit length and bit values are arbitrarily assigned to each of the respective bit positions. An external word to be searched for is contained in the Extent Word Register 38. A plurality of gates 40, 42 and 44, each respectively associated with a different bit order position of the registers, are enabled upon initiation of the searching operation. A signal indication of the binary value of each of the bits of the word in the External Register passes through the gate to the corresponding bit order position of all the Memory Registers and is compared to the binary value stored therein. A signal indication of the result of the comparison of all the bits in each Memory Register appears on the respectively corresponding word lines. For illustrative purposes it will be assumed that when the external word matches with a memory register word, the word line associated with that particular memory register will receive a signal indication of no-pulse and when there is not a match between the two compared words, the corresponding word line will receive a positive going pulse signal. In the illustration, word lines 20 and 26, respectively corresponding to Memory Registers 0 and 3, will have no pulse whereas word lines 22 and 24 respectively associated with Memory Registers 1 and 2, will receive positive going pulses as shown.

There is further shown in FIG. 1 a Command Pulse Source, 41, which generates a negative going pulse on line 43 in response to a received initiate-command signal on line 45, and an Interrogate Pulse Source, 46, which generates a positive pulse on line 48 in response to an initiate-interrogate signal on line 50. The command pulse on line 43 is applied to all stages of the Match Detector Register to initially set all of the stages to the same operating state. The interrogate pulse is applied to the interrogate line, which is shown in the form of a strip transmission line 52, which is coupled to all of the stages of the Match Detector Register. Strip transmission lines are well-known in the art and essentially have the same characteristics as any well-known transmission line, so a pulse applied to the input end of the interrogate line will propogate in a delayed manner through the line towards the termination end. A pair of impedances shown as resistors 54 and 56 are coupled to each end of the transmission line 52 and have impedance values substantially equal to the characteristic impedance, $Z_0$, of the transmission line. Although all four stages of the Match Detector Register are coupled in parallel to the strip transmission line 52, it should be noted that they are coupled in spaced-apart relationship along the transmission line in corresponding sequential order with stage 0 being coupled closest to the input end of the transmission and stage 3 being coupled furthest from the input end. As the interrogate pulse is applied to the transmission via line 48, it will appear at an input to each of thhe stages 10, 12, 14 and 16 via lines 60, 62, 64 and 66 respectively in this sequential order. As will be subsequently described in greater detail, as the interrogate pulse is applied to the respective stages, it will see either a high or a low impedance at the input to the stage, depending on the operational state of said stage. In sequentially sensing the state of the stages in this manner, if the pulse sees the stage as a high impedance, it will continue propagation towards the termination end. The first stage closest to the input end of the transmission line which presents a low impedance to the interrogate pulse will cause the pulse to pass through that stage where it is substantially completely absorbed so that further propagation is terminated. In passing through any stage, as will be shown in greater detail later, the interrogating pulse causes that stage to change operational states so that it in turn develops a signal output on the respectively corresponding output line 70, 72, 74 and 76. The Sequence Control Unit, 78, provides the means for initiating each of the operational steps in a proper sequential order and, in general, when used in combination with a digital computing device, would be part of the main control or a subportion of said main control of the digital computing device.

There will now be described a typical operation of the device shown in FIG. 1. It will be assumed that initially words are stored in the Memory Registers and the external word being searched for is contained in the External Word Register 38. The Sequence Control 78 provides an initiate-command signal on line 45 which is applied to the Command Pulse Source 41 so that the latter, in turn, generates a negative going pulse on line 43 to set all the bistable stages 10, 12, 14 and 16 to a first same operational state. For illustrative purposes, it will be assumed that this first state is such that all of the stages would appear as a low impedance to an interrogate signal applied to the interrogate line. After termination of the command pulse, the Sequence Control 78 provides an initiate-search signal on line 80 which enables all of the gates 40, 42 and 44. This allows the external word in the External Word Register 38 to be compared with all of the words stored in the Memory Registers with the resulting signals previously described and shown in FIG. 1 appearing on the respective word lines 20, 22, 24 and 26. The signal indication of a match, being the absence of a pulse, on word lines 20 and 26 applied to the respectively corresponding stages 10 and 16 result in no change in the operational state of said stages. The positive-going pulses appearing on word lines 22 and 24 are applied to the respectively corresponding stages 12 and 14 to cause said stages to switch to the other operational state which, in this illustrative operation, would be an operational state such that a high impedance would be presented to an interrogating pulse. Upon completion of the searching operation, the Sequence Control provides an initiate-interrogate signal on line 50 which is applied to the Interrogate Pulse Source 46 to cause the latter to generate an interrogate pulse on line 48. The interrogate pulse applied to the input end of the strip transmission line 52 in propagating toward the terminating end is applied first to stage 0, labelled 10, via line 60, and sees this stage as presenting a low impedance and so the interrogate pulse passes through this stage. In passing through this stage, the interrogate pulse causes the stage to switch to its other operational state, that is, from the condition of presenting a low impedance to the condition of presenting a high impedance which, in turn, produces an output signal on output line 70. This output signal gives an indication that the associated Memory Register 30 contains a word that matches with the external word. Since the interrogate pulse is absorbed in the stage, to determine if any additional stages of the Match Detector Register are in a condition indicating that their corresponding Memory Registers contain a word which matches with the external word, it is necessary to generate another interrogate pulse, which can be effected by the Sequence Control. This second interrogate pulse will now see stages 10, 12 and 14, the three lowest order stages of the Match Detector Register, as presenting a high impedance and will continue propagation towards the termination end. However, stage 16, the highest order stage of the Match Detector Register, will present a low impedance to the interrogate pulse so that the pulse will pass into stage 16 switching it to its other operational stage and developing an output signal on its output line 76. Any subsequent interrogate pulse applied to the strip transmission line will propagate all the way from the input to the termination end. It is obvious that appearance of the interrogation pulse at the termination end can be detected in any well-known manner to indicate that all matches between the external word and the stored words in the Memory Registers had been detected so as to terminate any further interrogation.

Although the interrogate line 52 is shown in the form of a strip transmission line, obviously other types of lines having similar transmission line characteristics can be utilized. An example of this is a lumped-constants delay line. The impedance 54 coupled to the input end of the interrogate line prevents any partial signal which may be reflected back toward the input from passing into the Interrogate Pulse Source, and in the well-known manner, impedance 56 prevents any substantial reflection of the interrogate pulse back toward the source when it propagates to the termination end.

From the foregoing, then, it can be seen that by initially placing all of the bistable stages, each associated with a different predetermined storage location, to a first operational state and causing said stages to switch to another operational state or remain unchanged in accordance with information-representing signals applied thereto from the corresponding storage locations, the effect of said latter signals on said stages can be detected by an interrogation pulse applied in sequential order to said stages.

Figure 2:
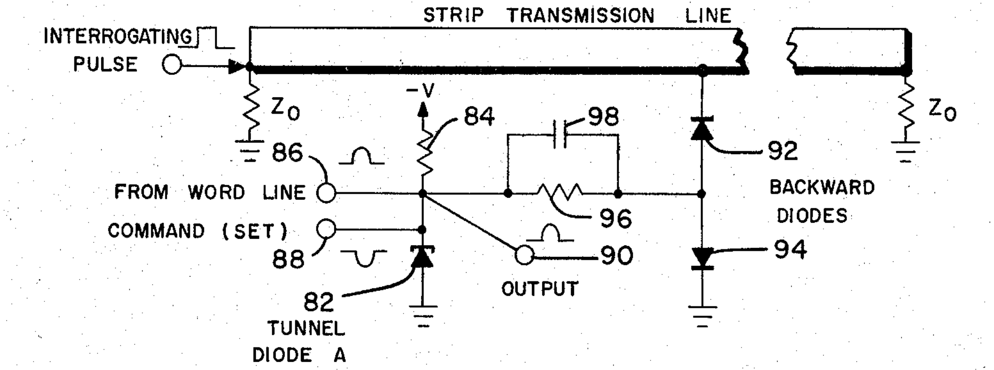
FIG. 2 is a schematic diagram of the circuitry of an embodiment of the bistable circuit of this invention.
Figure 3:
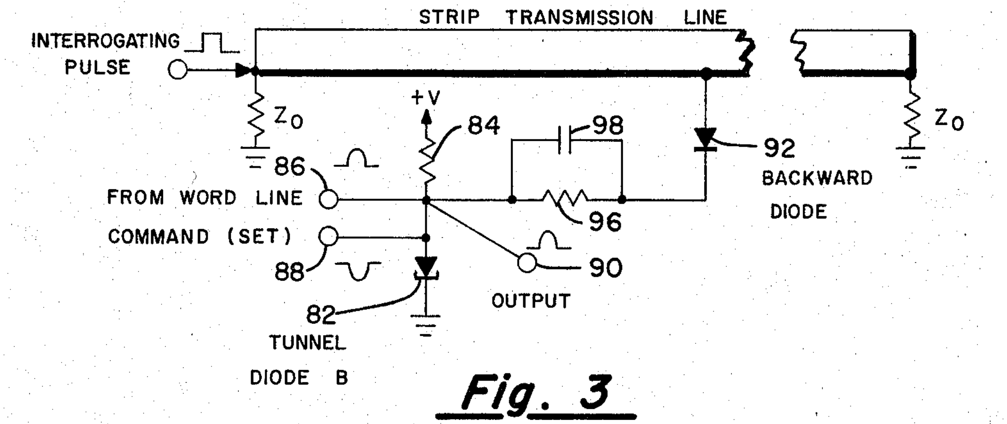
FIG. 3 is a schematic diagram of the circuitry of a further embodiment of the bistable circuit of this invention.
Figure 5:
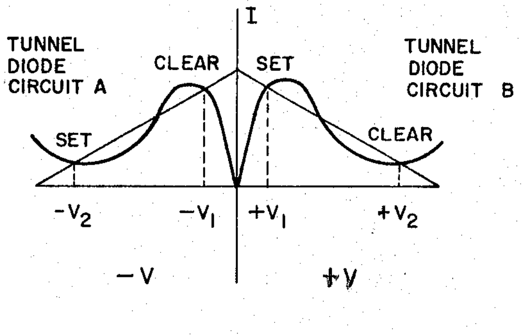
FIG. 5 shows typical V–I characteristics of the tunnel diodes utilized in the schematics of FIGS. 2–4.
Figure 6:
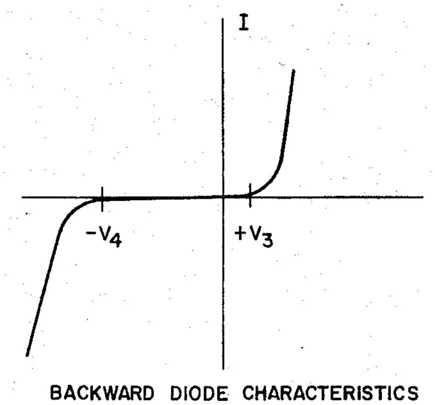
FIG. 6 shows typical V–I characteristics of the backward diodes used as the unilateral conducting means in the embodiments of the bistable circuits shown in FIGS. 2–4.

Referring now to FIG. 2, there is shown the schematic diagram of a first embodiment of a circuit which is utilizable as the circuitry in each of the four stages of the Match Detector Register of FIG. 1. Tunnel diode A, labelled 82, has a first electrode, which will hereafter be referred to as the anode, connected to a reference potential shown as ground. The other electrode of the tunnel diode, the cathode, is connected to energy source −V through an appropriately selected resistor 84. Connected to the junction of the one end of the resistor and the cathode of the tunnel diode is terminal 86 adapted to receive the signal from the corresponding word line of FIG. 1, the command signal input terminal 88 and output terminal 90. A pair of unilateral conducting devices, 92 and 94 respectively, which are preferably semiconductors commonly known as backward diodes, are connected back-to-back between the strip transmission line and ground with the cathode of diode 92 connected to the strip transmission line and the cathode of diode 94 connected to ground. A resistor 96 and a capacitor 98 in parallel combination, couple the junction of the anodes of the backward diodes to the cathode of the tunnel diode 82. Reference to FIG. 3 shows another embodiment for circuitry utilizable within the stages of the Match Detector Register of FIG. 1. The circuit arrangement is simliar to that of FIG. 2 except that diodes 92 and the tunnel diode B are oppositely polarized, the energy source for the tunnel diode is +V rather than -V and diode 94 has been eliminated. Since in the general case the component parts are identical except for the polarization and polarity, the same item numbers are used in FIG. 3 as in FIG. 2. FIG. 5 shows typical, well-known tunnel diode V–I characteristics with the left-hand characteristic curve labelled tunel diode circuit A corresponding to the tunnel diode A as polarized in FIG. 2 and the righthand characteristic curve representing the characteristics of tunnel diode B polarized in the manner shown in FIG. 3. The two stable operational points for each of the tunnel diode circuits are arbitrarily designated CLEAR and SET where the characteristic curve crosses the load line at each of two stable points. For the tunnel diode circuit A, the CLEAR condition is that in which the tunnel diode circuit is in a relatively low impedance level whereas the SET condition is that of a relatively high impedance level. The tunnel diode circuit B is in a relatively high impedance level in the CLEAR condition and is in a relatively low impedance level when in the SET condition. FIG. 6 shows typical V–I characteristics for the backward diode utilized in the circuitry of FIGS. 2 and 3. From the characteristic curve it can be seen that in the forward direction the backward diode has the usual characteristics except that the knee of the curve in the area where conduction is initiated is quite sharp, similar to the Zener effect. In reverse conduction, likewise the knee in the area of the initiation of conduction is quite sharp again similar to the Zener effect. Also, from the characterstic curve of FIG. 6, it can be seen that under D.C. operation conditions the voltage drop across the diode in the forward direction when conducting is indicated as being substantially less than the drop across the diode when conducting in the reverse direction. Further, the forward breakdown voltage required to initiate conduction is substantially less than that required for reverse breakdown conduction. It is also observed from the characteristic curve that if the diode is biased substantially to the knee of the curve (start of conduction) that under dynamic operating conditions of a pulse applied of a polarity to drive it still further into conduction, negligible drop of the pulse magnitude occurs across the diode. Because of the similarity of the circuit of FIG. 3 to that of FIG. 2, operation of the former will be readily understood from the following detailed description of the operation of the latter.

Applying a negative-going pulse signal on the command input terminal 88, said pulse in this instance being considered as a SET pulse, causes the tunnel diode 82 to operate in its SET state wherein the bistable circuit presents a relatively low impedance level to the strip line.

When an information-representing, positive-going pulse is applied to terminal 86, it causes the tunnel diode to shift operational states to the CLEAR condition wherein the bistable circuit presents a relatively high impedance level to the strip line. In FIG. 2, terminal 86 is designated as being coupled to the word line to more directly relate it to the system described in FIG. 1. However, it is understood that no limitation thereto is intended and that in the general case the signal applied to input terminal 86 is a binary-valued representation of any arbitrarily chosen information. Obviously, when a positive pulse is applied to terminal 86 the tunnel diode will switch to operate in the CLEAR condition. Assuming the latter, it can be seen that at the junction of resistor 84 and the cathode of the tunnel diode there will be a potential of a relatively small negative value designated in FIG. 5 as −V1. This potential coupled to the junction of the anodes of the backward diodes 92 and 94 will place a small negative voltage on the anodes of said diodes. A positive-going interrogating pulse applied to the cathode of diode 92 from the strip transmission line is insufficient to cause reverse breakdown of dode 92 because of the relatively low negative bias applied to its anode. This path then appears as a substantially open circuit to the interrogating pulse so that the pulse will propagate substantially unattenuated toward the terminating end of the transmission line. When the tunnel diode remains in the SET condition as the result of no information-representing pulse signal being applied to terminal 86, a relatively large negative bias is applied to the anodes of diodes 92 and 94. A subsequent positive-going interrogating pulse will therefore be passed through diode 92 in the reverse direction since the biasing potential causes said diode to appear as a low impedance to the interrogating pulse. The pulse passes through the combination of resistor 96 and capacitor 98 to the junction of resistor 84 and the cathode of the tunnel diode 82 and through the tunnel diode to cause it to switch from the SET state to the CLEAR state. The switching of states of the tunnel diode produces a positive output pulse signal at output terminal 90. The low impedance presented to the interrogating path through diode 92 is sufficient to substantially absorb all the power of said pulse to thereby terminate, to a substantially complete degree, the propagation of the pulse through the transmission line. It may further be seen that any subsequent interrogating pulses applied to the interrogating line will see this same circuit now as a high impedance because of the new operating state of the tunnel diode circuit.

Using some illustrative values for signal potentials, the biasing effect on the backward diodes 92 and 94 as determined by the operational state of the tunnel diode and the resulting response to the interrogating pulse can be be more clearly understood. In a typical case −V2 of FIG. 5 may be in the order of −700 mv. and −V1 in the order of −50 mv. In FIG. 6, in a typical case, +V3 which designates where substantial conduction in the forward direction just begins to occur, may be in the order of +80 mv. and −V4, where substantial conduction in the reverse direction just begins to occur, may be in the order of −600 mv. With the tunnel diode of the circuit of FIG. 2 in the SET condition, the −700 mv. at its cathode provides sufficient bias to the anodes of diodes 92 and 94 to cause the same to be in or substantially near the low impedance state in the reverse direction. The application of an interrogation pulse of a typical value of +500 mv. to the cathode of diode 92 drives it to heavy conduction in the reverse direction with relatively little drop in magnitude of the interrogation pulse since the diode 92 had already been biased close to its low impedance reverse-conduction state. However, the positive pulse appearing at the junction of the anodes of the two diodes tends to drive diode 94 toward the forward conducting region but with insufficient magnitude to drive it into the high forward conduction region. Therefore, the pulse will see diode 94 as a substantially high impedance as compared to the path through the resistor-condenser combination and the tunnel diode 82. Therefore, this pulse will pass through the tunnel diode and be of sufficient magnitude to cause the operational state of the tunnel diode to switch from its SET condition to the CLEAR condition. The foregoing does point out a requirement that the interrogating pulse has certain limitations. It cannot be so wide that a substantial portion thereof will still be present on the interrogating line after the tunnel diode has been switched to the CLEAR state since in the latter condition diode 92 will appear as a high impedance so that a portion of the interrogation pulse will propagate further through transmission line and possibly cause erroneous operation. On the other hand, of course, the pulse width must be of sufficient time duration to allow the tunnel diode to respond to the applied pulse. When the tunnel diode circuit is in the CLEAR condition so that —V1 of approximately —50 mv. appears at its cathode, the backward diodes 92 and 94 are biased only slightly in the reverse condition and the 500 mv. positive pulse applied to the transmission line will not be sufficient to cause any substantial breakdown in the reverse direction of diode 92, bceause of the relatively low negative bias on the anode.

Although diode 92 of FIG. 3 is designated as a backward diode, it operates in the more conventional manner as polarized in the circuit of FIG. 3. Reference to the characteristic curve in FIG. 5 shows that when the tunnel diode circuit B is in the CLEAR condition +V2 in the order of +700 mv. at the anode of the tunnel diode will back-bias diode 92 at or near the high reverse conduction condition. However, the +500 mv. interrogating pulse applied to the anode of diode 92 drives the diode toward the forward conducting condition but with insufficient magnitude to cause it to operate it in the heavy conduction area in the forward direction, therefore it presents a large impedance to the interrogating pulse. When the tunnel diode circuit is in the SET condition, the +V1 of the order of 50 mv. results in a very small positive potential being applied to the cathode of diode 92 so the positive interrogating pulse of 500 mv. does cause diode 92 to be driven into the heavy forward conduction area. The interrogating pulse passes through diode 92 and through the resistor-capacitor combination to tunnel diode 82 to cause the latter to change to the CLEAR condition.

Figure 4:
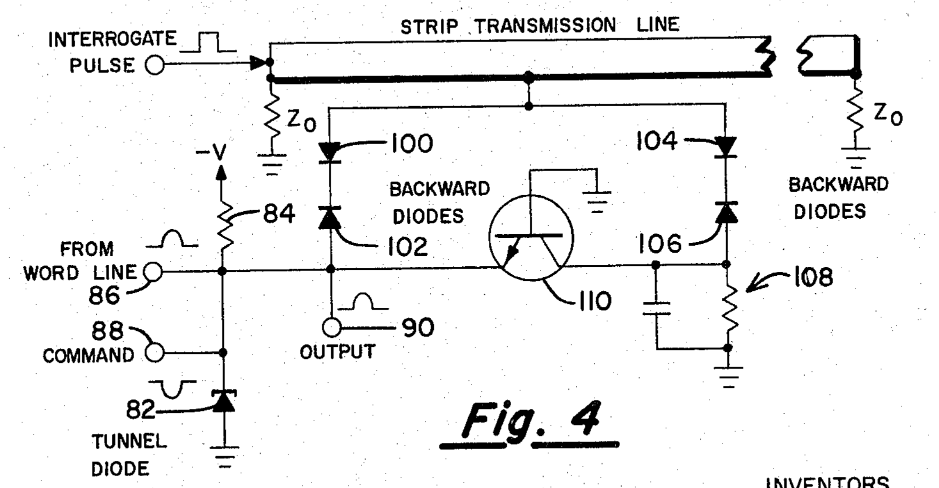
FIG. 4 is a schematic diagram of the circuitry of a still further embodiment of the bistable circuit of this invention.

FIG. 4 shows the schematic diagram of a further embodiment of the circuit utilizable in the stages of the Match Detector Register of FIG. 1. The bistable tunnel diode circuit and associated terminals are essentially the same as those of FIG. 2 so that the same item numbers are used. The characteristic curve for the tunnel diode of FIG. 4 can be considered as being similar to that shown for the tunnel diode circuit A in FIG. 5. A first pair of backward diodes 100 and 102 are coupled back-to-back with the anode of diode 100 connected to the strip transmission line and the anode of diode 102 connected to the junction of the tunnel diode cathode and the resistor 84. A second pair of backward diodes 104 and 106 are also connected to the interrogate line at the same place that the first pair are connected and in a similar manner are connected with their cathodes back-to-back. A resistor-capacitor combination, shown generally as 108, couples the anode of diode 106 to ground and the junction of the anode and the resistor-capacitor combination is coupled to the tunnel diode cathode through the emitter-collector circuit of NPN transistor 110. The base of said transistor is connected to ground, The initial operating condition of the tunnel diode is effected in the same manner as in FIG. 2 by the pulse applied to the command terminal 88. The tunnel diode circuit is switched to the CLEAR condition or retained in the SET condition in accordance with the information-representing signal applied to terminal 86. Using the same illustrative typical values of magnitude for the signals and the characteristic curves as previously used, when the tunnel diode is in the SET condition the transistor 110 is in the conducting condition since the base is more positive than the emitter. The —700 mv. of —V2 appears substantially at that magnitude at the anodes of diodes 106 and 102. Both pairs of diodes are then biased to the condition of high conduction in the reverse direction. The two parallel paths seen by the interrogate pulse at the anodes of diodes 100 and 104 both appear as relatively low impedances. This combination then serves to dissipate the interrogate pulse so that it is substantially absorbed in the circuit and is not propagated further through the transmission line. At the same time, the interrogation pulse in passing through the diodes 100 and 102 further passes through the tunnel diode to switch it from the SET to the CLEAR condition. There results a positive-going output pulse on terminal 90 in response to this switching action. When the tunnel diode is operating in its CLEAR condition, transistor 110 is biased to the off condition and both sets of diodes are biased to the non-conduction condition so that the stage will appear as a large impedance to any subsequent interrogation pulse applied to the strip transmission line.

Backward diodes are preferable for two principal reasons. One is that they are responsive to relatively low level signals in the forward direction, in a typical case 80 to 90 mv. signals will cause substantial conduction in the forward direction whereas conventional diodes may require up to 300 mv. The other principal advantageous feature of the backward diode is its characteristic of exhibiting the Zener effect so that once conduction is initiated either in the forward or reverse direction any further signal applied to increase conduction in the same direction is subjected to only a very small drop in signal level across the diode. Conventional diodes which have forward conduction which is less sharply defined do introduce more drop in the signal level of applied pulses.

The ratio of the characteristic impedance of the interrogate line to the dynamic impedance of the circuit as seen by the interrogate pulse in passing through the circuit, should be large enough to insure that any pulse remaining on the interrogate line is not sufficient to cause switching of any other circuit. In a typical case a 500 mv. interrogate pulse of five nanosecond pulse width successfully operated on the circuit of FIG. 2 in the manner described.

It is understood that suitable modifications may be made in the apparatus as disclosed provided such modifications come within the spirit and scope of the appended claims. Having now, therefore fully illustrated and described our invention what we claim to be new and desire to protect by Letters Patent is:

1. Apparatus of the nature described comprising in combination: N bistable circuits each having operational states of relatively high and relatively low impedance levels; first means coupled to all of said circuits for switching them to the same first impedance level; a group of N input lines each coupled to a respectively different one of the bistable circuits each of said lines being associated with a different one of a plurality of memory locations respectively designated 0 through N—1; means for applying information-representing binary signals to said group of lines for switching the respectively corresponding bistable circuits from said first impedance level to the other impedance level when the corresponding binary input signal is of a first binary value; an interrogate line constructed to experience transmission line effects having an input end and a terminating end; input circuit means coupling each of said bistable circuits in parallel to one another to said interrogate line in spaced relationship along said line with the bistable circuit associated with memory location 0 coupled closest to the input end and the remaining bistable circuits coupled in corresponding ascending order toward the terminating end; means for applying at least one interrogating pulse signal to the input end of the interrogate line said line effecting a propagation of the pulse toward the terminating end; said bistable circuit closest to the transmission line input end which is in said first impedance level presenting a low impedance to said pulse to terminate further propagation thereof; said input circuit passing said pulse to said bistable circuit to switch it from the low to the high impedance level; and output means coupled to each of the bistable circuits for providing a signal indication of the switching of the corresponding bistable circuit in response to the interrogating pulse.

2. Apparatus as in claim 1 where said bistable circuit comprises:

unilateral conducting means; semiconductor means constructed to experience tunnel diode effects including two operational states, and means coupling said unilateral conducting means to said semiconductor means, said first means supplying energy to said semiconductor means to cause it to shift from one of its operational states to the other.

3. Apparatus as in claim 2 further including: control means for activating said first means said means for applying information-representing signals and said means for applying an interrogate signal in corresponding sequential order.

References Cited by the Examiner

UNITED STATES PATENTS

| | | | |
|---|---|---|---|
| 3,089,121 | 5/1963 | Rhodes | 340—146.2 |
| 3,102,255 | 8/1963 | Currey et al. | 340—146.2 |
| 3,103,597 | 9/1963 | Novick et al. | 307—88.5 |
| 3,115,585 | 12/1963 | Feller et al. | 307—88.5 |

TERRELL W. FEARS, *Acting Primary Examiner.*

IRVING SRAGOW, BERNARD KONICK, *Examiners.*

T. W. FEARS, H. D. VOLK, *Assistant Examiners.*